United States Patent
Arndt

(10) Patent No.: US 6,488,750 B1
(45) Date of Patent: Dec. 3, 2002

(54) INKLESS FINGERPRINT COMPOUND AND METHOD

(75) Inventor: Douglas C. Arndt, Ventura, CA (US)

(73) Assignee: Armor Holdings Forensics Inc., Jacksonville, FL (US)

( * ) Notice: Subject to any disclaimer, the term of this patent is extended or adjusted under 35 U.S.C. 154(b) by 14 days.

(21) Appl. No.: 09/853,452

(22) Filed: May 10, 2001

(51) Int. Cl.⁷ .................................................. C09D 11/00
(52) U.S. Cl. .................................. 106/31.03; 106/31.01; 106/31.16; 106/31.02
(58) Field of Search ............................ 106/31.03, 31.01, 106/31.16, 31.2; 118/31.5; 427/1

(56) References Cited

U.S. PATENT DOCUMENTS

| | | | |
|---|---|---|---|
| 2,082,735 A | * 6/1937 | Heinecke | 427/1 |
| 3,851,619 A | * 12/1974 | Cofield et al. | 118/264 |
| 3,960,632 A | * 6/1976 | Gaines et al. | 118/264 |
| 4,182,261 A | 1/1980 | Smith, III et al. | |
| 4,190,056 A | 2/1980 | Tapper et al. | |
| 4,232,083 A | * 11/1980 | Buerkley et al. | 427/1 |
| 4,262,623 A | 4/1981 | Smith, III et al. | |
| 4,379,178 A | * 4/1983 | Meadows et al. | 118/31.5 |
| 4,699,077 A | 10/1987 | Meadows et al. | |
| 4,879,134 A | 11/1989 | Vassiliades et al. | |
| 4,983,415 A | 1/1991 | Arndt et al. | |
| 5,395,444 A | 3/1995 | Arndt et al. | |
| 5,919,292 A | 7/1999 | Arndt | |
| 6,027,556 A | 2/2000 | Arndt | |

* cited by examiner

Primary Examiner—Helene Klemanski
(74) Attorney, Agent, or Firm—Harold L. Jackson

(57) ABSTRACT

An inkless fingerprint compound includes a solvent, a color former, such as a transistion metal salt, compatible with the solvent and a developer such as hydroxiquinoline and derivatives, the developer capable of reacting with the color former to form a colorant product, preferably black in color. A sufficient amount of a chelating agent, such as a carboxylic acid, is added to the solution to prevent the color former and developer from reacting while in solution to form the colorant product while permitting such reaction when the solution is applied to the fingerprint area of the person to be fingerprinted and deposited onto a paper substrate.

30 Claims, No Drawings

INKLESS FINGERPRINT COMPOUND AND METHOD

FIELD OF THE INVENTION

The present invention is directed to an inkless fingerprinting compound and method of making the same.

DESCRIPTION OF THE PRIOR ART

Although there are other methods of identifying individuals, it has become readily apparent that fingerprints provide a unique and absolute means of identification that does not require cooperation from the subject. Since fingerprints are archived they must be permanent and because they are often captured by an electronic camera, the preferred color of fingerprint images is black. Printer's ink, which contains carbon pigmentation, meets the requirements of image permanency and color, but it tends to smear on paper, requires time to dry, soils the skin and equipment, is skill intensive and time consuming to use. While carbon based inks have been formulated with small amounts of carbon pigmentation to reduce the staining problem (U.S. Pat. No. 5,395,444 and U.S. Pat. No. 5,919,292), such inks are not completely stain free.

To remove some or all of the negative aspects the prior art carbon based inks, a considerable amount of effort has been directed to the development of inkless fingerprinting systems which do not rely on carbon particles to form an image of the fingerprint ridge pattern. Inkless technology has traditionally been defined as a color forming chemical reaction, between at least two reagents, that occurs at the time of fingerprint development. The chemical reaction between the two (or more) reagents provides a permanent perceivable colorant product representative of a fingerprint ridge pattern on the recording medium. Current technology dictates that the two reagents remain isolated from each other until the fingerprint is to be taken.

Typically a nonstaining first reagent is applied to a person's fingertips and a second reagent, capable of reacting with the first reagent to produce the colorant product such as 8-hydroxyquinoline, is pre-applied to or inherent in the recording medium such as the paper or card receiving the print. The second reagent can also be inherent in the paper receiving the print. See U.S. Pat. No. 4,983,415. Also see U.S. Pat. Nos. 4,262,623 and 4,182,261, the contents of which are incorporated herein by reference.

While the state of the art inkless systems have achieved considerable commercial success, they have their own set of shortcomings in addition to the need for two separated reagents. U.S. Pat. No. 4,190,056 Tapper et al relates to a method of reacting iodide with starch added to a paper recording medium, which fails to produce a black image. U.S. Pat. No. 4,879,134 to Vassiliades et al, discloses a fingerprinting composition which utilizes a chromographic compound and a color developing compound in one solution. While the Vassiliades et al patent refers to the system as an inkless system it is more properly classified as a nonstaining system since as the patent points out the liquid vehicle for the composition "is a solvent for said chromogenic compound and reaction product", i.e., the reagents react while in the solution, prior to being applied to the finger and paper substrate (Col. 2, lines 36–37). Furthermore, it is not apparent that the images produced by the method would be sufficiently permanent. Also, it is not believed that AFIS (Automatic Fingerprint Information System) scanners would be able to satisfactorily capture images produced using this method.

U.S. Pat. No. 4,699,077 to Meadows & Diamond relates to a method involving chemically treated paper, a method that necessitates the cost of custom coating paper and this coating has a limited shelf life and is degraded when exposed to light. U.S. Pat. No. 4,983,415 to Arndt et al relates to an inkless system in which the fingerprint is captured on a thermosensitive recording surface, but this surface is not available on paper suitable for fingerprint cards, it yellows in the presence of light, it can not be used on checks and other documents, and it is not as inexpensive as commonly available, ordinary paper. U.S. Pat. No. 4,262,623 to Smith III et al relates to a method of recording inkless impressions on plain paper. However, this invention is costly, the apparatus requires a source of high voltage electricity and is therefore limited in its scope of operations and the system requires a lengthy image development process which can emit an offensive odor.

There is a need for an inkless fingerprinting system which overcomes the disadvantage of the prior art inkless technology systems. To fulfill this need, I have developed a single inkless fingerprint compound, i.e., liquid, paste or soap (i.e., vicious liquid), which can be transferred from a self-dispensing pad, such as ceramic, plastic, etc., to a person's fingerprint area and then to an ordinary paper recording medium. The system does not require the use of reagents maintained in separate locations thereby eliminating the conventional two step inkless system, i.e., one reagent to be transferred by the fingertip to the recording medium and a second reagent impregnated or inherent in the recording medium. Further, unlike the Vassiliades et al system the reagents while maintained in a single container or dispensing pad are not allowed to react until the fingerprint is taken. I have found that the compound of my invention, through its interaction with moisture from the skin and/or the recording medium, rapidly forms a permanent, substantially dry, smear resistant and nonstaining perceivable colorant product of the ridge pattern representing the person's fingerprint.

SUMMARY OF THE INVENTION

In accordance with the present invention an inkless fingerprint compound for providing a permanent colorant product representing a person's fingerprint when applied to the person's fingerprint area and deposited onto a paper substrate includes a solvent, a color former, such as a transition metal salt compatible with the solvent, and a developer, such as 8-hydroxyquinoline and its derivatives, capable of reacting with the color former to form the colorant product. The compound further includes a sufficient amount of a chelating agent, such as a carboxylic acid, to substantially prevent the color former and developer from reacting while in solution to form the colorant product while permitting such reaction when the solution is applied to the finger of the person to be fingerprinted and deposited onto the paper substrate.

The inkless fingerprinting compound may be in the form of a liquid, paste or soap (i.e., viscous liquid) and may be dispersed via a conventional ink type pad made for example of ceramic or plastic or other material which does not react with the compounds ingredients. Examples of suitable dispensing pads are disclosed in U.S. Pat. Nos. 4,262,613, 4,182,261 and 6,027,556.

DESCRIPTION OF THE PREFERRED EMBODIMENT

The following description is provided to enable persons skilled in the art to make and use the invention and sets forth the best mode contemplated by the inventor of carrying out his invention. Various modifications, however, will be apparent to those skilled in the art, since the generic principles of the present invention have been set forth herein specifically to provide a single inkless fingerprint compound which deposited onto an ordinary paper substrate by a person's finger, palm or foot will form a permanent colorant product delineating the ridge pattern of the fingerprint area.

In accordance with the present invention an inkless fingerprint compound for forming an permanent, substantially dry, smear resistant and nonstaining perceivable colorant product representing the ridge pattern of a person's fingerprint when applied to the person's finger and deposited onto an ordinary paper substrate is prepared by mixing a color former, a developer and a chelating agent in a compatible solution such as an aqueous solution. Additional reagents may be added to the mixture as will be described. The principal reagents, i.e., the color former and developer, are maintained in equilibrium, i.e., substantially kept from reacting to form the colorant product while in solution, as a result of the tight bond between the chelating agent and the color former. The chelating agent serves as a blocking agent while the color former and the developer are in solution in a container or self-dispensing pad while permitting the reagents to react when applied to a person's finger (or other portions of the body) and subsequently deposited onto an ordinary paper substrate.

The color former may be one or more of the transition metal salts selected from the groups 5A–8A, 1B–5B and 7B of the periodic Table of Elements. More specifically while salts of iron, e.g., ferric chloride, have been found very satisfactory, salts of titanium, vanadium, chromium, magnesium, cobalt, nickel, copper, zirconium, zinc, niobium, molybdenum, silver, tantalum and tungsten have been found satisfactory.

The developer may be chosen from a group of reagents which form a colored reaction product with the chosen color former. While 8-quinolinol sulfate (developer) has been found to complex with ferric chloride (color former) to provide a permanent reaction product (black in color), other developers such as 2,4,6-Trihydroxy Benzoic Acid; 3,4,5-Trihydroxy Benzoic Acid; Dimenthyl Glyoxime; Rubeanic Acid; Pyrogallol; Hydroquinoline and its derivatives; Pyrocatechol; Propyl Gallate; Resorcinol; β-Resorcylic Acid; Tiron (4,5-Dihydroxy-m-Benzene Disulfonic Acid Di-sodium Salt); Gentisic Acid; Procatechuic Acid; Phloroglucinol; and Tannic Acid and its derivatives have also been found to satisfactorily complex with one or more of the above color formers to provide perceivable colorant product representing a person's fingerprint when deposited by the finger onto an ordinary paper substrate.

Developers, sometimes referred to as ionic binding developers, such as potassium ferrocyanide and sodium ferrocyanide and sulfide precursors such as sodium tetrathionate, sodium thiosulfate, diethyldithio carbamic acid, or 2-pyrrolidinecarbodithoic acid, may also be used. The resulting color, i.e., black, red, green etc. will depend upon the color former and developer used.

The chelating agent is an organic chemical capable of combining with (i.e., tightly binding with) heavy and alkali metal cations in the solution. I have found that a carboxylic acid, such as citric acid, when added to the transition metal salt in a sufficient quantity functions to block any substantial reaction between the color former and the developer until the fingerprinting procedure is initiated. The chelating agent may be bidentate, tridentate or tetradentate with 2, 3 or 4 sites, respectively, corresponding to number of donor atoms, (capable of sharing electrons) with election-deficient sites on metal ions, i.e., coordination sites. While there is an abundance of chelating agents or chelants capable of sequestering transition metal ions I have found that, among carboxylic acids, tartaric, suberic, succinic, malic, and axelaic acids with an electron donor site capability of –2 are also suitable. Other chelants such as gluconates, polyacrylates, oxalates, and polyaspartates, sodium tripolyphosphate, aminopolycarboxylic acids, ethylenediaminetetracetic acid (EDTA) and nitrilotriacetic acid (NTA) and amines such as diethanolamine and triethanolamine will also serve the purpose. The preferred carboxylic acid is 2-hydroxy-1,2,3-propanetricarboxylic acid.

It is necessary to add a sufficient (e.g., stoichiometric) quantity of the chelating agent to the solution to sequester all or substantially all of the transition metal ions. Where the color former is a trivalent metal salt such as ferric chloride, with an ionic charge of +3 and the chelant is citric acid, with an electron-donor site capability of –3, the molar ratio of the color former and chelant should be about equal, i.e., 1:1. Adding citric acid in a molar ratio greater than the moiety, i.e., 1:1, will drive the equilibrium of the chemistry more strongly toward the formation of ferric citrate in the solution. When this is done, to prevent any staining of the skin by the color forming reaction, the development of the colorant product on the paper substrate is retarded. It is possible to find a balance between the development speed of the image on the paper substrate and the cleanliness of the inkless solution on the skin. It is to be noted that whatever chelant and color former are used the molar ratio of chelant to color former must be such as to substantially sequester all of the metal irons. For example, when a chelant with an electron donor site capability of –2, such as tartaric acid, is used with a trivalent metallic salt, such as ferric chloride, a molar ratio of at least 3:2 of acid to salt is needed to fully sequester all of the metal ions.

The following formulations of an inkless fingerprinting compound are examples only and not to be considered as limiting the scope of the present invention.

EXAMPLE 1

600 milliliters glycerol—solvent 400 milliliters de-ionized water—solvent 50 milliliters polysorbate 20—wetting agent/surfactant/emulsifier 270 grams ferric chloride hexahydrate—color former 193 grams citric acid—chelant 1,165.2 grams 8-quinolinol sulfate—developer The above solutions may be contained within a self-dispensing pad as is commonly known in the art. Applying the above solution to a person's fingerprint area and subsequently depositing the same onto an ordinary paper substrate yields a permanent black, i.e., colorant product. It is not certain why the secretions (and perhaps moisture) from the skin and the components of ordinary paper push the equilibrium of the compound toward the formation of the colorant reaction product.

The above formulation is desirable when an image such as a fingerprint must have a print contrast signal ("PCS") of at least 0.72, as required by law enforcement agencies in the United States, i.e., $PCS=(S-1)/S$ where "S" is the diffuse reflectance of the print on a white background (card stock, paper) and "I" is the average diffuse reflectance measured at the center of a fingerprint's ridge lines. The concentration of the principal reagents may be substantially reduced when high-contrast images are not required.

Alternatively ferric sulfate or other transition metal salts may be used as the color former. 8-quinolinol sulfate may be substituted with other 8-quinolinol esters, such as the citrate or the acetate, or with 8-quinolinol and its derivatives such as 8-hydroxyquinaldine sulfate, 8-hydroxyquinoline-5-sulfonic acid, 8-hydroxyquinoline-7-iodo-5-sulfonic acid, and 2-chloro-8-hydroxyquinoline sulfate.

Other solvents which may be used in the above example include diols, glycol ethers, glycol esters, carbitols, glycerol esters, castor oil esters, and fatty alcohols. The wetting agent/surfactant/emulsifier, polysorbate 20, may be replaced by polysorbate 80, Dowfax® 2A-1, Chembetaine® C, and many other surfactants. The percentage of surfactant/wetting agent and/or emulifier, where used, can be varied between about 0.5% and 10% of the total solution by weight.

EXAMPLE 2

50 ml glycerylmonoricinoleate—solvent
50 ml ethylene glycol monophenyl ether—solvent
10 ml laurate ester of sorbitol (polysorbate 20)—wetting agent/surfactant/emulsifier
9 gm ferric chloride hexahydrate—color former
6.5 gm citric acid—chelant
14.5 gm 8-hydroxyquinoline—developer It is to be noted that neither the color former, developer nor the chelant is limited to a single chemical.

It has also been discovered that water-soluble salts and derivatives of 8-hydroxyquinoline may be prepared as an emulsion or as a viscous liquid soap to minimize any staining of the finger. An emulsion may be prepared from water, mineral oil polysorbate 20, and a glycol or glycerol. A soap may be prepared using sodium lauryl sulfate or lauramide, soyamide, or cocamide DEA. These methods impart a slippery consistency to the reagent solution which makes it easier to rub away any residue left on the finger.

Fatty acid esters of glycerol and glycol, as well as fatty alcohols (e.g., iso-cetyl and lauryl) are also useful solvents that help minimize staining of the skin because of their oily nature.

These methods in conjunction with increasing the chelant concentration will work together to render the compound quite clean on the skin.

While it is generally preferable to add the chelating agent to the solution containing the color former before adding the developer, the chelating agent may be added after the developer depending upon the reagents used and/or the timing of adding the reagents to the solution.

The present invention provides a simple and inexpensive inkless fingerprinting compound and method of making the same. The compound may be retained in any compatible conventional dispensing pad and applied by a person's fingerprint area, i.e., finger tips, foot, palm etc. and then deposited on an ordinary paper recording medium. The residue left on the person's fingerprint area, if noticeable at all, can be easily and readily removed. The compound deposited onto the paper substrate quickly forms a perceivable colorant product, preferably of a black color depending upon the transaction metal, which represents the ridge pattern of the area being fingerprinted. The spirit and scope of the present invention is defined by the appended claims.

What is claimed is:

1. An inkless fingerprinting compound which, when applied to a person's fingerprint area and deposited onto a paper substrate, forms a colorant product representing the persons's fingerprint comprising:
    a solvent;
    a color former;
    a developer capable of reacting with the color former to form the colorant product; and
    a sufficient amount of a chelating agent capable of binding with the color former to substantially prevent the color former and developer from reacting while in solution to form the colorant product while permitting such reaction when the solution is applied to a person's fingerprint area and deposited onto a paper substrate.

2. The fingerprint compound of claim 1 wherein the color former comprises one or more transition metal salts.

3. The fingerprint compound of claim 2 wherein the developer is a reagent selected from one or more of the group consisting of:
2,4,6-Trihydroxy Benzoic Acid
3,4,5-Trihydroxy Benzoic Acid
Dimenthyl Glyoxime
Rubeanic Acid
Potassium Ferrocyanide
Sodium Ferrocyanide
Pyrogallol
Hydroquinoline and its derivatives
Pyrocatechol
Propyl Gallate
Resorcinol
Resorcylic Acid
4,5-Dihydroxy-m-Benzene Disulfonic acid Di-sodium salt
Gentisic Acid
Procatechuic Acid
Phloroglucinol
Tannic Acid
Sodium Tetrathionate
Sodium Thiosulfate
Diethyldithio Carbamic Acid
2-Pyrrolidinecarbodithoic Acid.

4. The fingerprint compound of claim 3 wherein the chelating agent is a carboxylic acid or polycarboxylic acid.

5. The fingerprint compound of claim 2 wherein the color former is one or more metallic salts wherein the metals are selected from the groups consisting of those listed in the periodic table under columns 5A, 6A, 7A, 8A, 1B, 2B, 3B, 4B, 5B and 7B.

6. The fingerprint compound of claim 5 wherein the color former is selected from the group consisting of ferric chloride and metal salts wherein the metals are selected from the group consisting of titanium, vanadium, chromium, magnesium, cobalt, nickel, copper, zirconium, zinc, niobium, molybdenum, silver, tantalum and tungsten.

7. The fingerprint compound of claim 3 wherein the developer is selected from the group consisting of 8-hydroquinoline and its derivatives.

8. The fingerprint compound of claim 7 wherein the developer is 8-quinolinol.

9. The fingerprint compound of claim 8 wherein the color former is a ferric salt.

10. The fingerprint compound of claim 9 wherein the ferric salt is ferric chloride hexydrate.

11. The fingerprint compound of claim 10 wherein the carboxylic acid is 2-hydroxy-1,2,3-propanetricarboxylic acid.

12. The fingerprint compound of claim 11 wherein the chelating agent is ethylene diamine tetracetic acid.

13. The fingerprint compound of claim 11 wherein the chelating agent is nitrilotriacetic acid.

14. A method for making an inkless fingerprint compound which when applied to a person's fingerprint area and deposited onto a paper substrate will form a colorant product representing the person's fingerprint comprising:

1) providing a solution of a color former;
2) adding to the solution an effective amount of a developer which is capable of reacting with the color former to form the colorant product; and
3) adding to the solution, before and after step 1, a sufficient amount of chelating agent to substantially prevent the color former and developer from reacting while in solution while permitting such reaction when the solution is applied to a person's fingerprint area and deposited onto the paper substrate.

15. The method of claim 13 wherein step 1 comprises adding one or more transistion metal salts to a compatible solvent.

16. The method of claim 15 wherein the chelating agent is a carboxylic acid or polycarboxylic acid.

17. The method of claim 15 wherein the developer is selected from one or more of the following group consisting of:
2,4,6-Trihydroxy Benzoic Acid
3,4,5-Trihydroxy Benzoic Acid
Dimenthyl Glyoxime
Rubeanic Acid
Potassium Ferrocyanide
Sodium Ferrocyanide
Pyrogallol
Hydroquinoline and its derivatives
Pyrocatechol
Propyl Gallate
Resorcinol
β-Resorcylic Acid 4,5-Dihydroxy-m-Benzene Disulfonic acid Di-sodium salt
Gentisic Acid
Procatechuic Acid
Phloroglucinol
Tannic Acid
Sodium Tetrathionate
Sodium Thiosulfate
Diethyldithio Carbamic Acid
2-Pyrrolidinecarbodithoic Acid.

18. The method of claim 16 wherein the chelating agent is a carboxylic acid or polycarboxylic acid.

19. The method of claim 18 wherein the transition metal salt is a ferric salt.

20. The method of claim 19 wherein the ferric salt is ferric chloride hexydrate.

21. The method of claim 20 wherein the carboxylic acid is 2-hydroxyl-1,2,3-propanetricarboxylic.

22. The method of claim 15 wherein the developer is 8-hydroxyquinoline sulfate.

23. The method of claim 14 further including adding a wetting agent/surfactant/emulsifier in an amount of between 0.5% and 10% by weight.

24. The method of claim 23 wherein the solvent includes water.

25. The method of claim 24 wherein the solvent includes glycerol.

26. The method of claim 24 wherein the solvent is selected from the group consisting of water, glycerol, diols, glycol ethers, glycol esters, carbitols, glycerol esters, castor oil esters, and fatty alcohols.

27. An inkless fingerprint solution comprising:
 a color former;
 a stoichiometric amount of developer capable of reacting with the color former to provide a colorant product; and
 a stoichiometric amount of chelating agent capable of preventing any substantial reaction between the color former and the developer while in solution.

28. The fingerprint solution of claim 27 wherein the color former is a transition metal salt.

29. The fingerprint solution of claim 28 wherein the chelating agent is a carboxylic acid or polycarboxylic acid.

30. The fingerprint solution of claim 29 wherein the developer is an 8-hydroquinoline derivative.

* * * * *

UNITED STATES PATENT AND TRADEMARK OFFICE
CERTIFICATE OF CORRECTION

PATENT NO.    : 6,488,750 B1
DATED         : December 3, 2002
INVENTOR(S)   : Arndt It is certified that error appears in the above-identified patent and that said Letters Patent is hereby corrected as shown below:

Column 6,
Line 25, "Resorcylic Acid" should read -- β-Resorcylic Acid --

Column 7,
Line 30, "4,5-Dihydroxy-m-Benzene Disulfonic" should be moved to line 31, before "acid Di-sodium salt".

Column 8,
Line 9, after "2-hydroxyl-1,2,3-propanetricarboxylic" insert -- acid --.

Signed and Sealed this

Twenty-second Day of July, 2003

JAMES E. ROGAN
*Director of the United States Patent and Trademark Office*